United States Patent [19]

Benton et al.

[11] 4,063,413

[45] Dec. 20, 1977

[54] CHAIN COUPLING DEVICE AND METHOD OF MANUFACTURE THEREOF

[75] Inventors: Reuben Paul Benton, North Tonawanda; Kenneth D. Schreyer, Clarence, both of N.Y.

[73] Assignee: Columbus McKinnon Corporation, Tonawanda, N.Y.

[21] Appl. No.: 781,293

[22] Filed: Mar. 25, 1977

[51] Int. Cl.² .................. F16G 15/04; B21L 11/08; B21L 13/00
[52] U.S. Cl. .................. 59/35 CP; 59/85; 59/88
[58] Field of Search .................. 59/78, 84, 85, 86, 88, 59/91, 93, 35

[56] References Cited

U.S. PATENT DOCUMENTS

| | | | |
|---|---|---|---|
| 2,406,712 | 8/1946 | Robbins | 59/85 |
| 2,422,844 | 6/1947 | Mullaney | 59/86 |
| 2,972,223 | 2/1961 | Devonshire | 59/88 |
| 3,104,519 | 9/1963 | Kelting | 59/86 |
| 3,453,822 | 7/1969 | Crook | 59/85 |
| 3,846,978 | 11/1974 | Schreyer | 59/85 |
| 3,974,640 | 8/1976 | Schreyer | 59/85 |

Primary Examiner—C.W. Lanham
Assistant Examiner—Gene P. Crosby
Attorney, Agent, or Firm—Bean, Kauffman & Bean

[57] ABSTRACT

There is disclosed an improved coupling device or "link" for interconnecting separate lengths of chain and/or attachments thereto and/or for repairing broken chains and method of producing same; said coupling link comprising two half-link units each of which comprises a laminar assembly of two or more relatively nested and interfittingly configured strap-like members. These members are stamped out in generally U-shaped plan form from sheet or plate stock; the legs thereof then being twisted while the intermediate bow-shaped portions of the members remain flat-wise in the planes of the original stampings. Such half-link units may then be assembled and fabricated from only a minimized number (one or two) of differently configured strap-like members disposed in laminate relationship. The bow-shaped portions of the members of each sub-assembly are then structurally integrated as by a welding process or the equivalent; and the terminal ends of the legs thereof (which are apertured) are then interdigitally mounted upon a common interconnecting pin.

10 Claims, 15 Drawing Figures

CHAIN COUPLING DEVICE AND METHOD OF MANUFACTURE THEREOF

CROSS REFERENCE TO RELATED PATENTS

This application relates to the art discussed and disclosed in U.S. Pat. No. 3,974,640; and other references known to applicants are: U.S. Pat. Nos. 3,104,519; 3,373,560; 3,453,822; 3,846,978; 2,406,712; 2,369,344; 2,972,223, and British Pat. No. 271,378.

BACKGROUND AND OBJECT OF THE INVENTION

This invention relates to improvements in chain coupling links, such as are adapted for use in the field (or shop) to couple separate lengths of chain together, and/or accessories thereto; and/or to repair broken chains; and the like. Such "coupling" links find utility as explained for example in the above referenced U.S. Pat. No. 3,974,640. The object of the present invention is to provide an improved coupling link as referred to above which is not only as strong and durable as are coupling links of the prior art, but which also is much less expensive to manufacture. When operating under load the legs of the coupling device of the invention torsionally absorb and cushion the load carying parts thereof in novel manner.

THE DRAWING

By way of example, embodiments of the invention are illustrated in the accompanying drawings, wherein.

Figure 1:
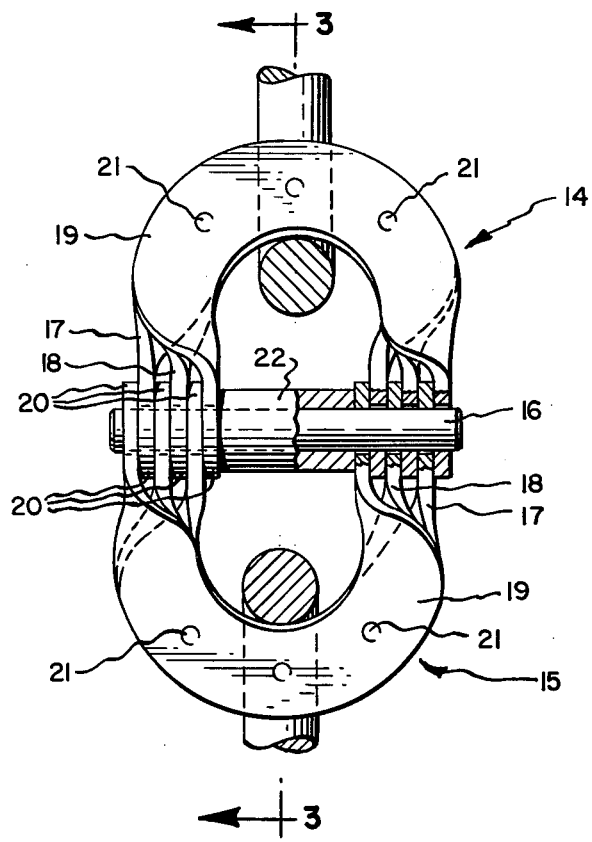
FIG. 1 is a front elevational view partly in section; showing one form of a coupling link construction of the present invention.
Figure 2:
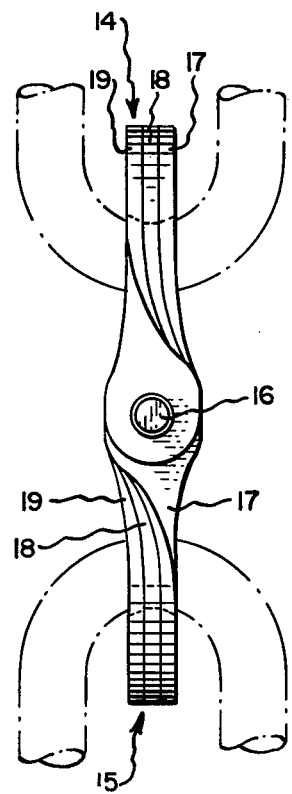
FIG. 2 is a side elevational view thereof.
Figure 3:
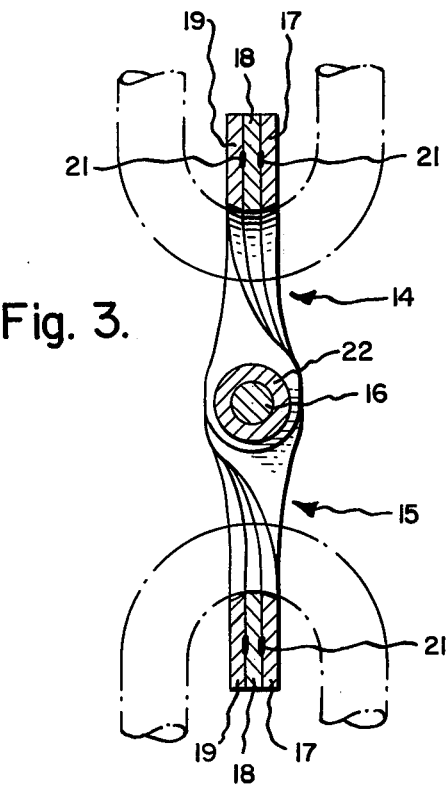
FIG. 3 is a sectional view taken as indicated by line 3—3 of FIG. 1.
Figure 8A:
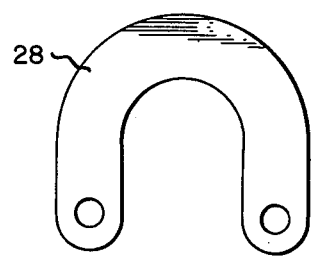
Figure 8B:
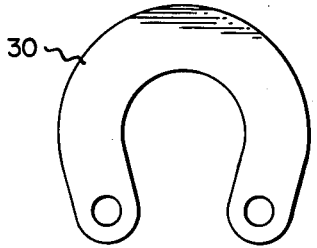
Figure 8:
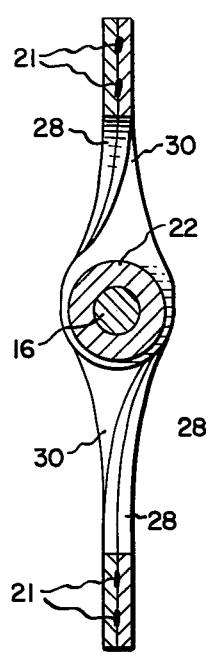
Figure 6:
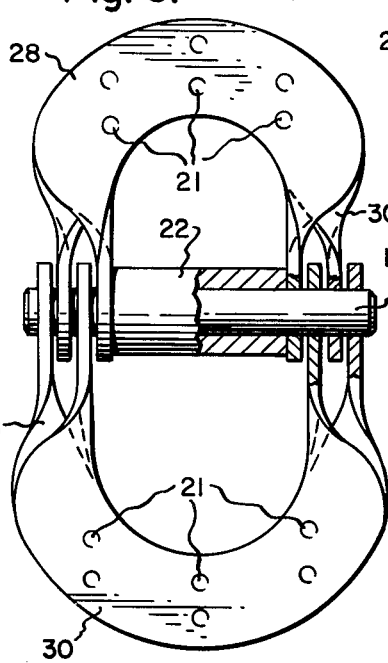
Figure 7:
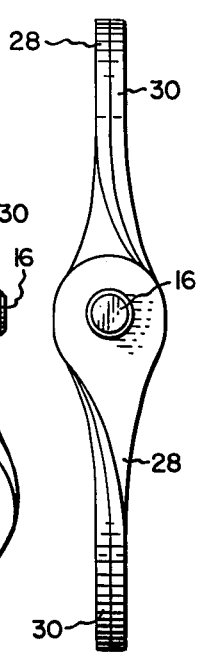
Figure 4A:
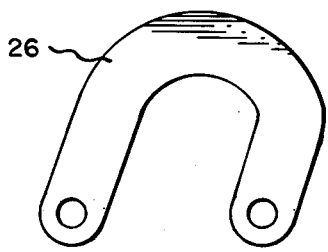
FIG. 4a is a disassembled front elevational view of a stamping cut out of sheet or plate metal stock material; four of which such stampings may be employed to comprise the four strap-like members as are required for the assembly of FIG. 4.
Figure 4:
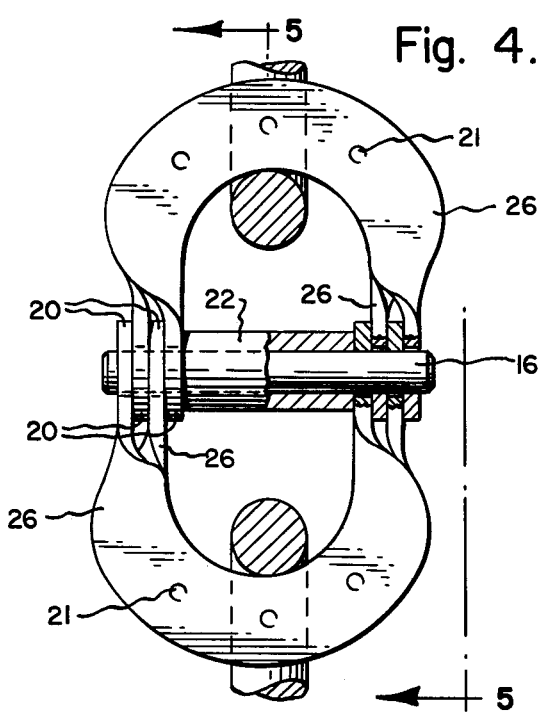
FIG. 4 is a view corresponding to FIG. 1, but illustrates another form of coupling link of the invention.
Figure 9:
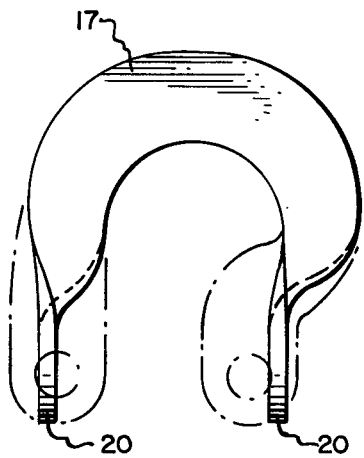
Figure 10:
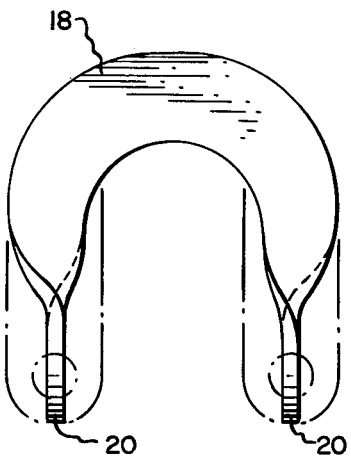
Figure 11:
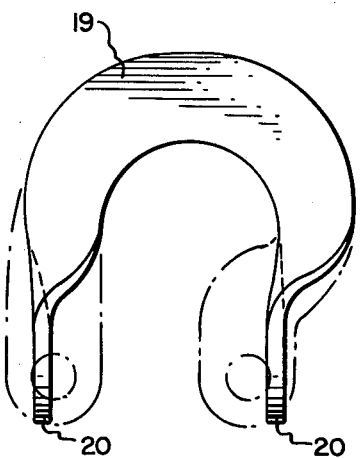
Figure 12:
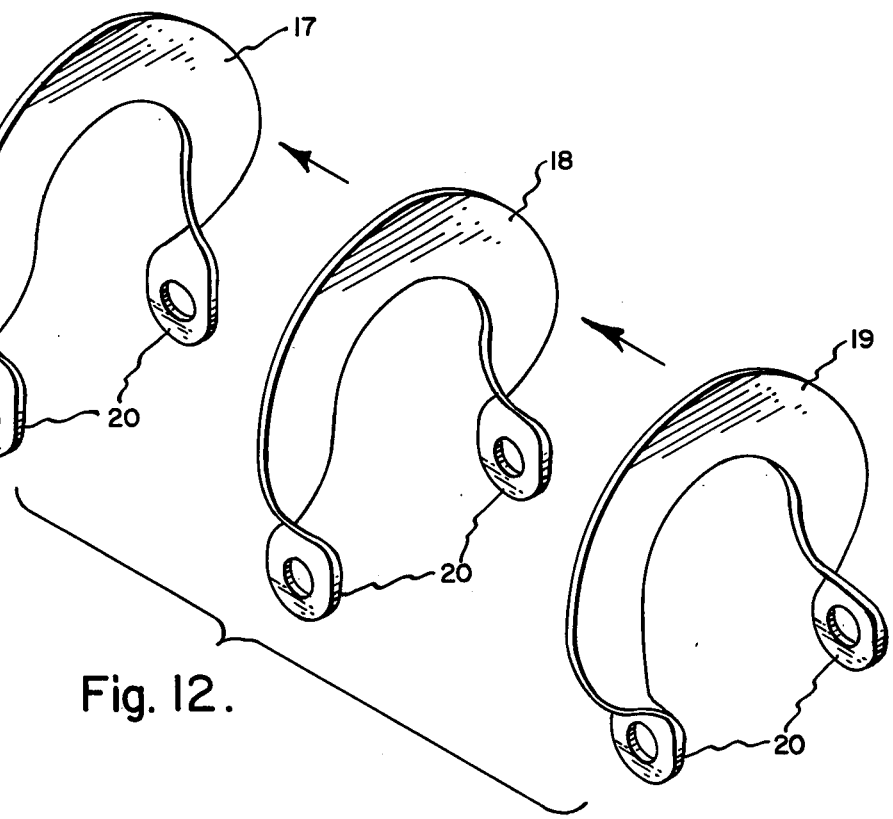

FIG. 6 corresponds to FIGS. 1 and 4 but illustrates still another form of the invention;

FIG. 7 is a side elevation of the link of FIG. 6;

FIG. 8 is a sectional view taken as suggested by line 8—8 of FIG. 6;

FIGS. 8a–8b are views corresponding to FIG. 4a, but illustrate the planform configurations of two differently styled blanked out stock pieces; one each of which is required in the fabrication of each sub-assembly of the coupling link as shown in FIGS. 6, 7, 8;

FIG. 9 is a disassembled front elevational view, showing in solid lines the finalized configuration of the strap member 17 of FIGS. 1–3, and in broken lines the original configuration of the flat stamping from which it was made;

FIGS. 10, 11, correspond to FIG. 9 but show both the original and final configurations of the strap members 18 and 19 of FIGS. 1–3; and FIG. 12 illustrates in perspective how the members 17, 18, 19, are relatively oriented preliminary to assembly of the half link units of the device as illustrated at FIGS. 1–3.

As illustrated herein, the coupling device of the invention typically includes a pair of identical half-link units such as are designated generally by the numerals 14, 15, which are interconnected by a pin 16. As shown by way of example at FIGS. 1–3, the half link units may in each case comprise a relatively nested trio of generally U-shaped strap-like members 17, 18, 19; the members 17 and 19 being identically stamped from flat sheet metal stock to be originally shaped as illustrated by the broken line showings at FIGS. 9 and 11. Note that in this case the members 17 and 19 are formed from stampings having one "straight" leg portion and one "elbow" shaped leg. The leg and portions thereof are thereupon 90° twisted in opposite directions by any suitable means such as a "forming" machine, into the solid line configurations thereof as are shown at FIGS. 9, 11, so as to terminate in parallel forwardly disposed ear portions 20—20; while the bow-shaped intermediate portions thereof remain "flat" or in the plane of the sheet stock material. The ear portions 20—20 are apertured so as to subsequently receive the pin 16, thus providing for assembly of the device, as will be described more fully hereinafter. FIG. 10 illustrates how the strap member 18 is fabricated; showing by means of broken lines how the member is initially blanked out of flat sheet material so as to have both legs to be of "straight" configuration. Following this both of the apertured leg end portions thereof are twisted 90° in the same direction into the finalized configuration thereof as shown by means of the solid lines of FIG. 10, while the bow-shaped intermediate portion thereof remains in "flat" configuration.

In order to assemble a half-link unit of the invention as shown at FIGS. 1–3, a member 17 is disposed flatwise on a support surface; a member 18 of the configuration as shown at FIG. 10 is then superposed thereon; and then a member as shown at 19 is reversely oriented (as illustrated at 19, FIG. 12) and is then superposed upon the member 18. The strap members 17, 18, 19, thereupon interfit and provide a trio-laminate; the apertures through their respective leg portions being thus brought into mutual alignment to receive the connecting pin 16, while the intermediate bow-shaped portions therefor thus adapted to be spot-welded together as illustrated at 21 (or otherwise structurally integrated, as understood in the art). Thus, it will be appreciated that a pair of such half link units may be fabricated from only two kinds of differently configured stampings which are structurally integrated and then interdigitally mounted upon the common interconnecting pin 16 as shown at FIGS. 1–3. As shown at 22, the pin 16 may be retained in proper position by means of a retainer sleeve (such as shown for example in U.S. Pat. No. 2,972,223). However it is to be understood that any other suitable device may be employed to retain the pin 16 in position.

Figure 5:
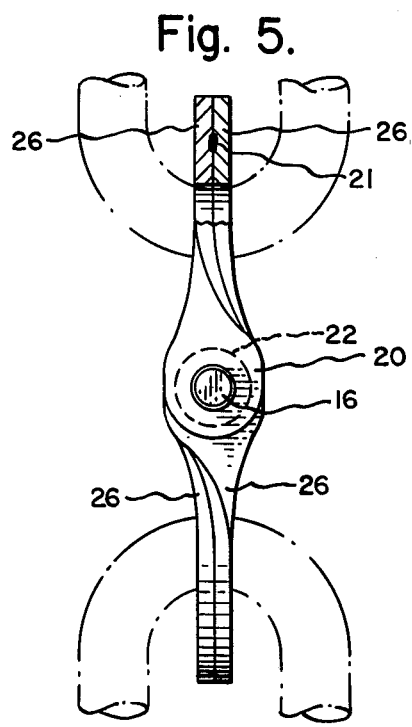
FIG. 5 is a side elevational and parti-sectional view taken as suggested by line 5—5 of FIG. 4.

As illustrated by FIGS. 4 and 5 herein, another form of coupling link of the invention may be constructed to comprise an assembly of four identically blanked out strap members 26 as are illustrated by FIG. 4a. Note that the leg portions of these members when initially blanked out of flat stock material are parallel but slant laterally in plan view. The ends of the legs are then identically 90° twisted, and in order to fabricate each one-half sub-assembly of the coupling device of the invention as shown in FIGS. 4, 5, one of the strap members of each pair is flopped over and then disposed to nest relative to the other strap member of the pair;

whereupon the unit may be structurally integrated as explained hereinabove and then finally assembled on the pin 16.

FIGS. 6–8 illustrate still another form of coupling device of the invention wherein strap members 28 and 30 of somewhat different planform configurations are initially stamped out of flat sheet material as shown at FIGS. 8a and 8b. The terminal ends of the legs thereof are then twisted so that the members are adapted to be nested into complementary assembled form as shown at FIGS. 6–8. Note that in this case the legs of the paired strap members are twisted in opposite directions instead of in the same direction, as in the case of the fabrications illustrated by FIGS. 1–5.

In all cases the "strap" members of the assemblies of the invention will preferably be formed of somewhat yieldable, high tensile strength, sheet or plate metal stock material. In some instances the design prerequisites will call for use of steel or other metal as the stock material; but it is to be understood that the invention is also applicable to use of other suitable materials such as plastics, or the like.

It is by virtue of this invention that the twisted leg portions of the individual lamina automatically distribute the load responsive tension and shear forces throughout the entire structure of the coupling device when under operative loadings. Because the interdigitated ear portions of the strap members separately apply in alternate relation only fractional portions of the overall operational loadings upon the pin 16, the pin is therefore required to withstand only substantially lower shear stresses at any one section thereof. Furthermore, note that when the coupling device of the invention is under load the leg portions of the strap members tend to "return twist" towards their original flat configurations. In consequence the leg portions of adjacent strap members (referring for example to the showing in FIG. 1) "work" against each other in this respect, thereby further minimizing twist stresses on the connecting pin and increasing its useful life.

We claim:

1. An improved chain coupling link device comprising;
    a pair of sub-assembly units each being of generally U-shaped planform configurations hingedly interconnected by means of a hinge pin, wherein each of said sub-assembly units comprises a laminate of two or more strap-like members;
    said members each being blanked from flat sheet or plate stock material into generally U-shaped planforms to include a flat intermediate bow-shaped portion subtended by at least generally parallel leg portions, the terminal ends of said leg portions being apertured and 90 degree twisted relative to said intermediate bowed portion and mounting therethrough said hinge pin; said intermediate bowed portions being of their original blanked out planar configurations;
    pluralities of said members of each of said units being nested together in laminar relation;
    and means structurally integrating the relatively laminated intermediate bow-shaped portions of said members.

2. A chain coupling device as set forth in claim 1, wherein each of said sub-assembly units comprises a pair of relatively laminated said members.

3. A chain coupling device as set forth in claim 1, wherein each of said sub-assembly units comprises a trio of said members in laminated relationship.

4. A chain coupling device as set forth in claim 3, wherein one of said members of each trio is blanked out to be of parallel straight leg configuration and wherein the others of said members are blanked to include one straight leg portion and one elbow shaped portion.

5. A chain coupling device as set forth in claim 2, wherein said members are blanked out to be of laterally slanting parallel straight leg configurations.

6. A chain coupling device as set forth in claim 2, wherein one of said members is initially blanked out in parallel straight leg shaped form whereas the other of said members is of inwardly converging oppositely curved leg configuration.

7. The method of providing a chain coupling link device of the type comprising two sub-assembly units of substantially U-shaped form including bow-shaped intermediate portions extending into generally parallel leg portions which are apertured in transversely algined relation to receive therethrough a mutually connecting hinge pin to provide a complete coupling link, and wherein each of said sub-assembly units comprises a laminate of two or more strap-like members, said improved method comprising:
    A. blanking pluralities of said members from flat sheet or plate stock material into generally U-shaped planforms each comprising a flat bow-shaped portion subtended by two generally parallel leg portions, the terminal ends of said leg portions being apertured;
    B. twisting the terminal end portions of the legs of said members right-angularly;
    C. superposing pluralities of said members with the flat bow-shaped portions thereof disposed in laminarly stacked relation;
    structurally integrating the bow-shaped portions of said relatively laminated members to provide a sub-assembly unit; and
    D. slide-fitting a hinge pin laterally through mutually aligned apertured portions of the legs of a pair of said sub-assembly units to complete said coupling link device.

8. The method as set forth in claim 7, wherein prior to slide-fitting of said pin through said leg portions adjacent of said members are disposed in parallel spaced apart relation, and wherein the leg portions of the members of said paired sub-assembly units are then interdigitally disposed in hingedly connected relation upon said pin.

9. An improved chain coupling link device comprising:
    a pair of sub-assembly units each being of generally U-shaped planform configurations hingedly interconnected by means of a hinge pin, wherein each of said sub-assembly units comprises a laminate of two or more strap-like members;
    said members each being blanked from flat sheet or plate stock material into generally U-shaped planforms to include a flat intermediate bow-shaped portion subtended by at least generally parallel leg portions, the terminal ends of said leg portions being apertured and twisted relative to said intermediate bowed portion and mounting therethrough said hinge pin; said intermediate bowed portions being of their original blanked out planar configurations;

pluralities of said members of each of said units being nested together in laminar relation;

and means structurally integrating the relatively laminated intermediate bow-shaped portions of said members.

10. The method of providing a chain coupling link device of the type comprising two sub-assembly units of substantially U-shaped form including bow-shaped intermediate portions extending into generally parallel leg portions which are apertured in transversely aligned relation to receive therethrough a mutually connecting hinge pin to provide a complete coupling link, and wherein each of said sub-assembly units comprises a laminate of two or more strap-like members, said improved method comprising:

A. blanking pluralities of said members from flat sheet or plate stock material into generally U-shaped planforms each comprising a flat bow-shaped portion subtended by two generally parallel leg portions, the terminal ends of said leg portions being apertured;

B. twisting the terminal end portions of the legs of said members;

C. superposing pluralities of said members with the flat bow-shaped portions thereof disposed in laminarly stacked relation;

structurally integrating the bow-shaped portions of said relatively laminated members to provide a sub-assembly unit; and D. slide-fitting a hinge pin laterally through mutually aligned apertured portions of the legs of a pair of said sub-assembly units to complete said coupling link device.

* * * * *